United States Patent
Lakshminarayan et al.

(10) Patent No.: US 9,218,527 B2
(45) Date of Patent: Dec. 22, 2015

(54) ANOMALY DETECTION IN STREAMING DATA

(75) Inventors: Choudur Lakshminarayan, Austin, TX (US); Alexander Singh Alvarado, Gainesville, FL (US); Jose C. Principe, Gainesville, FL (US); Evan Kriminger, Gainesville, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 502 days.

(21) Appl. No.: 13/248,887

(22) Filed: Sep. 29, 2011

(65) Prior Publication Data

US 2013/0085715 A1   Apr. 4, 2013

(51) Int. Cl.
*G06F 17/18*   (2006.01)
*G06K 9/00*   (2006.01)

(52) U.S. Cl.
CPC ........ *G06K 9/00536* (2013.01); *G06K 9/00523* (2013.01)

(58) Field of Classification Search
CPC ............................ G06K 9/536; G06K 9/523
USPC .............................. 702/179; 726/25; 700/110
See application file for complete search history.

(56) References Cited

U.S. PATENT DOCUMENTS

2007/0286071 A1* 12/2007 Cormode et al. ............. 370/229
2012/0137367 A1*  5/2012 Dupont et al. ................. 726/25
2012/0245481 A1*  9/2012 Blanco et al. ................ 600/544

OTHER PUBLICATIONS

Alexander Singh Alvarado, et al.; Local Frequency Based Estimators for Anomaly Detection in Oil and Gas Applications; Department of Electrical and ComputerEngineering, University of Florida, Gainesville, Florida, USA, Hewlett-Packard Laboratories, JSM 2011.
B. Widrow and S. D. Stearns, Adaptive signal processing. Upper Saddle River, NJ, USA: Prentice-Hall, Inc., 1985.
F. Takens, "Detecting strange attractors in turbulence," in Dynamical systems and turbulence, D. A. Rand and L. S. Young, Eds. New York: Spinger-Verlag, 1980, pp. 366-381.
J. C. Principe, N. R. Euliano, and W. C. Lefebvre, Neural and Adaptive Systems: Fundamentals through Simulations with CD-ROM, New York, NY, USA, John Wiley & Sons, 1999.
J. C. Principe, W. Liu, and S. Haykin, Kernel Adaptive Filtering: A Comprehensive Introduction. John Wiley & Sons, Inc., 2010.
J. G. Proakis and D. K. Manolakis, Digital Signal Processing (4th Edition). Prentice Hall, Mar. 2006.
M. Hill, M. Campbell, Y.-C. Chang, and V. Iyengar, "Event detection in sensor networks for modern oil fields," in DEBS '08: Proceedings of the second international conference on Distributed event based system, pp. 95-102.
P. Grassberger and I. Procaccia, "Measuring the strangeness of strange attractors," Physica D: Nonlinear Phenomena, vol. 9, no. 1-2, pp. 189-208, 1983.

(Continued)

*Primary Examiner* — John Breene
*Assistant Examiner* — Hien Vo
(74) *Attorney, Agent, or Firm* — Rathe Lindenbaum LLP

(57) ABSTRACT

An example method for anomaly detection in streaming data includes applying statistical analysis to streaming data in a sliding window. The method also includes extracting a feature. The method also includes determining class assignment for the feature using class conditional probability densities and a threshold.

20 Claims, 9 Drawing Sheets

(56) References Cited

OTHER PUBLICATIONS

P. P. Pokharel, W. Liu, and J. C. Principe, "Kernel least mean square algorithm with constrained growth," Signal Process., vol. 89, no. 3, pp. 357-365, 2009.

S. Mallat, A Wavelet Tour of Signal Processing, Third Edition: The Sparse Way. Academic Press, 2008.

T. M. Apostol, Mathematical Analysis. Addison Wesley, Jan. 1974.

* cited by examiner

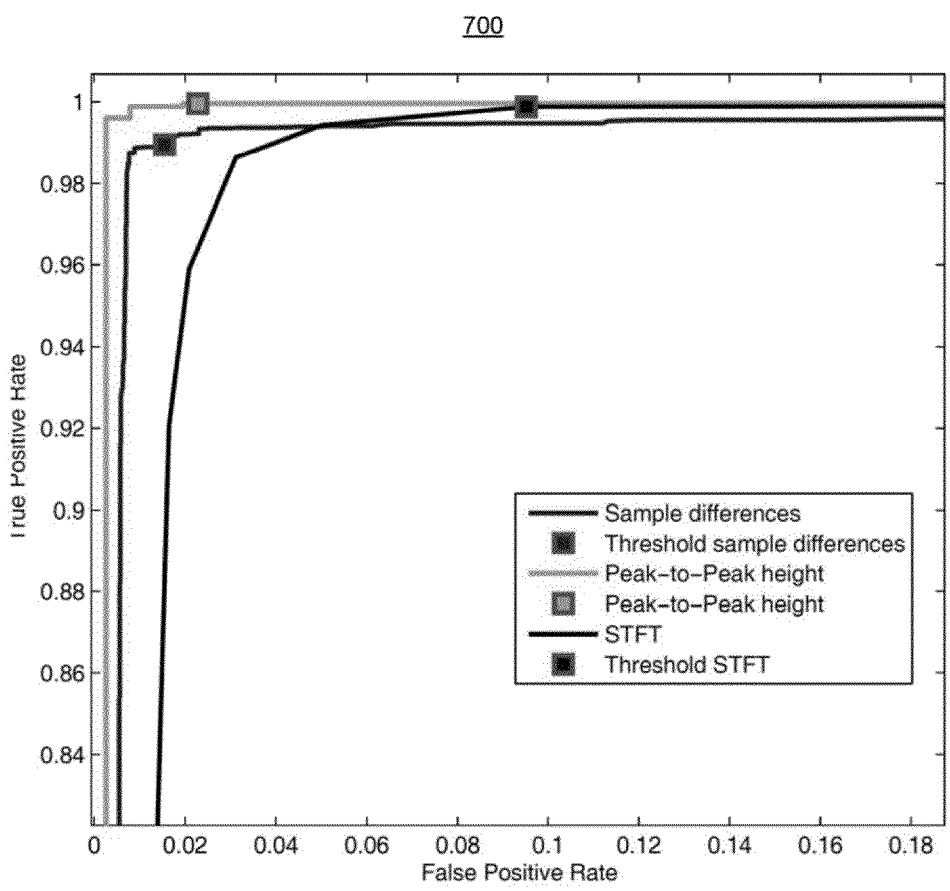

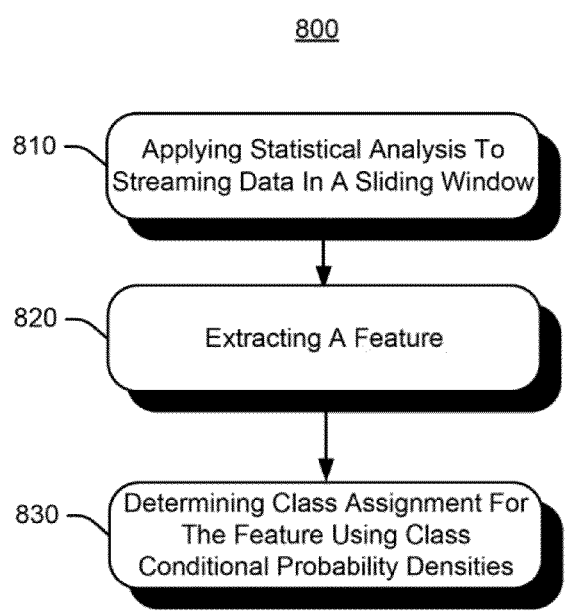

ANOMALY DETECTION IN STREAMING DATA

BACKGROUND

Data collected from sensors in real-time applications is commonly referred to as time series data, streaming data, and/or data streams, and represents a substantially continuous flow of data. For example, modern industrial facilities often have multiple sensors to gather a wide variety of data types for monitoring the state or condition of various operations at the facility. The streaming data may be analyzed to detect "events" and thus warn of impending failures. By way of illustration, oil and gas production equipment can be highly specialized (and even custom manufactured for a site). Repair and replacement is often expensive, particularly for offshore assets. Early detection and prevention of problems can result in higher production and lower costs.

Oil and gas production equipment is often located in remote areas, offshore, or in extremely hot, cold, or even dangerous environments. For all of these reasons, it is often desired in the oil drilling and production industry to utilize automated surveillance systems to monitor various stages of production and aid the operators with ensuring production with few, if any, interruptions.

The oil and gas industry often equips oil and gas wells with thousands of sensors and gauges to measure flow rates, pressure, and temperature, among other parameters. Any variations in flow rate, pressure and/or temperature may indicate an issue that needs to be addressed in order to avoid a partial or even complete shutdown of the oil well, which can lead to lost productivity and lower profit margins.

But data collected from these sensors can be "noisy," the data often does not have a constant amplitude, and the data can be plagued by shifts in the mean. These aspects of the data make it difficult to accurately model the data stream and extract relevant events. In addition, quickly detecting changes can be difficult in a real-time or "online" environment, due to the reliance on intensive mathematical analysis which can take significant time to compute.

BRIEF DESCRIPTION OF THE DRAWINGS

FIG. 7 is a plot showing receiver operating characteristic curves using different thresholds.

FIG. 8 is a flowchart illustrating example operations which may be implemented anomaly detection in streaming data.

DETAILED DESCRIPTION

Figure 1:
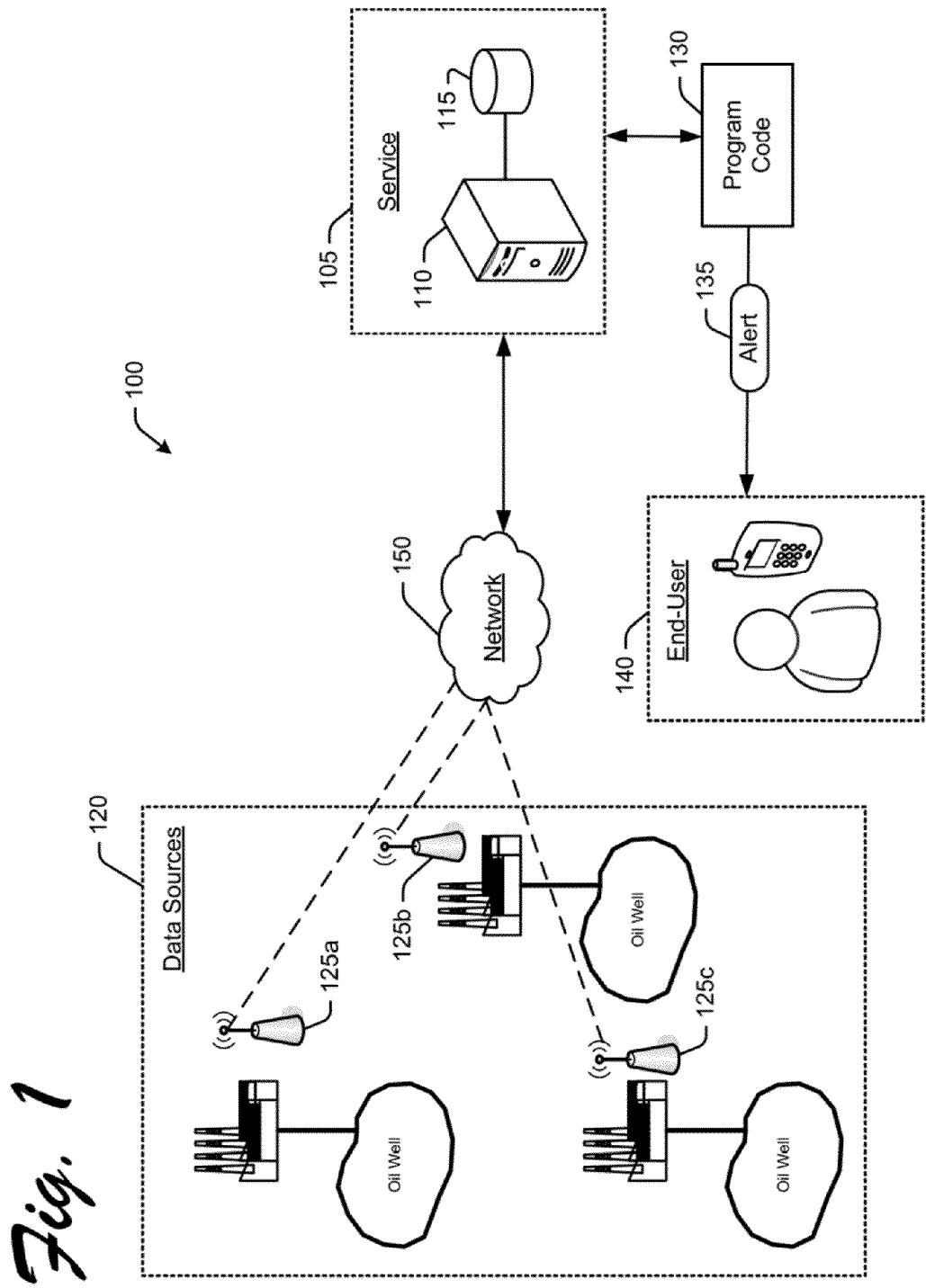
FIG. 1 is a high-level illustration of an example networked computer system which may be implemented for anomaly detection in streaming data.

The supply of petroleum products that can be easily reached and refined is finite, which motivates oil and gas producers to extract as much as possible from a given well. Therefore, it is desirable to maintain a continuous, or substantially continuous flow to enhance production. Any interruptions to the flow can result in lost production capacity and the associated costs.

Modern oil fields are equipped with thousands of sensors and gauges to measure various physical and chemical characteristics of the surrounding terrain, in addition to the production and distribution systems. Continuous streams of sensor readings are analyzed to understand the various stages of oil production and distribution.

By way of illustration, after drilling into the earth's subsurface to tap oil deposits, the bore well is managed to yield maximum capacity. Several aspects introduce tremendous variability into the production process. An often monitored variable in oil and gas production is the flow rate. Higher flow rates with fewer disruptions, result in greater yields.

Two common occurrences in oil production that cause disruptions to flow rates are known as "slugging" and "churn." Slugging refers to turbulent flows where gas bubbles coalesce, expand, and collapse continuously. Changes in fluid composition from wholly liquid to wholly gaseous over time, can lead to churn which is a frequent cause of flow disruption. Some factors that affect flow rates include fluid composition, oil viscosity, compressibility, specific gravity, specific gravity of water, and solids content, among others. These factors can produce varying flow regimes.

Flow rates along a bore well tend to be oscillatory, which are detrimental to the oil extraction process, by leading to fluctuations along the shafts affecting the integrity of the equipment. Detecting changes to flow patterns can be accomplished, for example, by monitoring streaming data for 1) high amplitude, high oscillation, 2) low amplitude, high oscillation, 3) low oscillation with pseudo-periodic behavior, 4) normal flow rate followed by a jump, and anomalous flows that are some combination of the characteristics described in 1-4 above. Monitoring for oscillation can be used for early detection and prediction of churn in flow rates.

Detecting anomalies in data streams (such as slugging and churn in flow regimes) can be used to issue an alert in advance of an event so that corrective action can be taken before the event leads to a disruption. Of course, analyzing data streams are not limited to the oil and gas industry and the techniques described herein have application in a wide variety of fields.

Briefly, the systems and methods described herein enable anomaly detection in streaming data, using frequency domain analysis and pattern recognition. In an example, program code stored on non-transient computer-readable media is executable by a processor to apply statistical analysis to streaming data in a sliding window. A coefficient is extracted with maximum magnitude. The coefficient is then used to determine class assignment using class conditional probability densities.

Accordingly, the systems and methods described herein can be implemented to uncover hidden time varying periodicities in flow rate, which can be used to invoke nonlinear modeling techniques to separate high oscillation regimes (churn) from non-oscillating regimes (normal flow). The approaches described herein are computationally "lightweight," and thus can be implemented in an online setting (e.g., in near real-time) for process interdiction and correction. When sensors are networked, the systems and methods described herein may be extended to detect trends, patterns, affinities, and correlations across the network.

Before continuing, the terms "includes" and "including" mean, but is not limited to, "includes" or "including" and "includes at least" or "including at least." The term "based on" means "based on" and "based at least in part on."

FIG. 1 is a high-level block diagram of an example networked computer system 100 which may be implemented for anomaly detection in streaming data. System 100 may be implemented with any of a wide variety of computing devices 110, such as, but not limited to, server computers and appliances (e.g., devices dedicated to providing a computing service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute program code for carrying out the operations described herein.

In an example, the computing device 110 may receive streaming data from one or more source 120, such as sensors 125a-c. For purposes of illustration, the sensors shown in FIG. 1 are used to gather flow rate data from oil well(s). However, it is noted that data streams are not limited to use in the oil and gas industry, and can include other sources. Other sources of streaming data may include weather data, vehicle traffic, network traffic for a data center, electricity for a smart grid, water measurements for a treatment facility, and even vitality data for a person or biological system, to name only a few examples of streaming data.

There is no limit to the type or amount of data that may be provided by a source. In addition, the content may include unprocessed or "raw" data, or the content may undergo at least some level of processing. For example, data may be filtered prior to executing the operations described herein to reduce noise injected into the data stream which is not representative of actual data from the sensor(s).

The data stream may be accessed for online data processing by a computing device 110 configured as a server computer with computer-readable storage 115. Program code 130 executing on the computing device 110 may analyze the streaming data and issue alerts, e.g., indicative of a change in regime in the data stream. Program code 130 may also include interfaces to application programming interfaces (APIs) and related support infrastructure, including hosted monitoring services 105 which can be used to provide the alerts 135 to a facility operator or other customer based on the change in regime so that additional monitoring and/or corrective action can be taken in a timely manner.

Although, it is noted that the operations described herein may be executed by program code 130 residing on a server device, other computing devices may also be implemented. Other computing devices may include, but are not limited to a personal computer, a tablet or other mobile device. In an example, mobile devices used on-site by an end-user 140 such as a facility operator may be implemented in conjunction with a "back-end" computer system having more processing capability, such as the server computer 110, or a plurality of server components in a data center or "cloud computing" environment.

The system 100 may also include a communication network 150, such as a local area network (LAN) and/or wide area network (WAN). In one example, the network 150 includes the Internet or other mobile communications network (e.g., a 3G or 4G mobile device network). Network 150 may also provide greater accessibility for use in distributed environments, for example, where more than one source is providing the streaming data. The various sensor(s) and computing device(s) may be provided on the network 150 via a communication connection, such as via an Internet service provider (ISP). In this regard, access may be provided directly via the network 150, or via an agent, such as another network. Such an implementation may be particularly desirable where an operator is responsible for monitoring multiple, geographically distributed production sites, for example, in the oil and gas or other industries.

As mentioned above, the program code 130 may be executed by any suitable computing device to analyze data stream. In addition, the program code may analyze one or more than one data stream. The operations described herein are not limited to any specific implementation with any particular type of program code. In an example, the program code may be implemented in machine-readable instructions (such as but not limited to, software or firmware). The machine-readable instructions may be stored on a non-transient computer readable medium and are executable by one or more processor to perform the operations described herein. It is noted, however, that the components shown herein are provided only for purposes of illustration of an example operating environment, and are not intended to limit implementation to any particular system.

The program code executes the function of the architecture of machine readable instructions as self-contained modules. These modules can be integrated within a self-standing tool, or may be implemented as agents that run on top of an existing program code. Operations performed by executing the program code can be understood with reference to FIG. 2.

Figure 2:
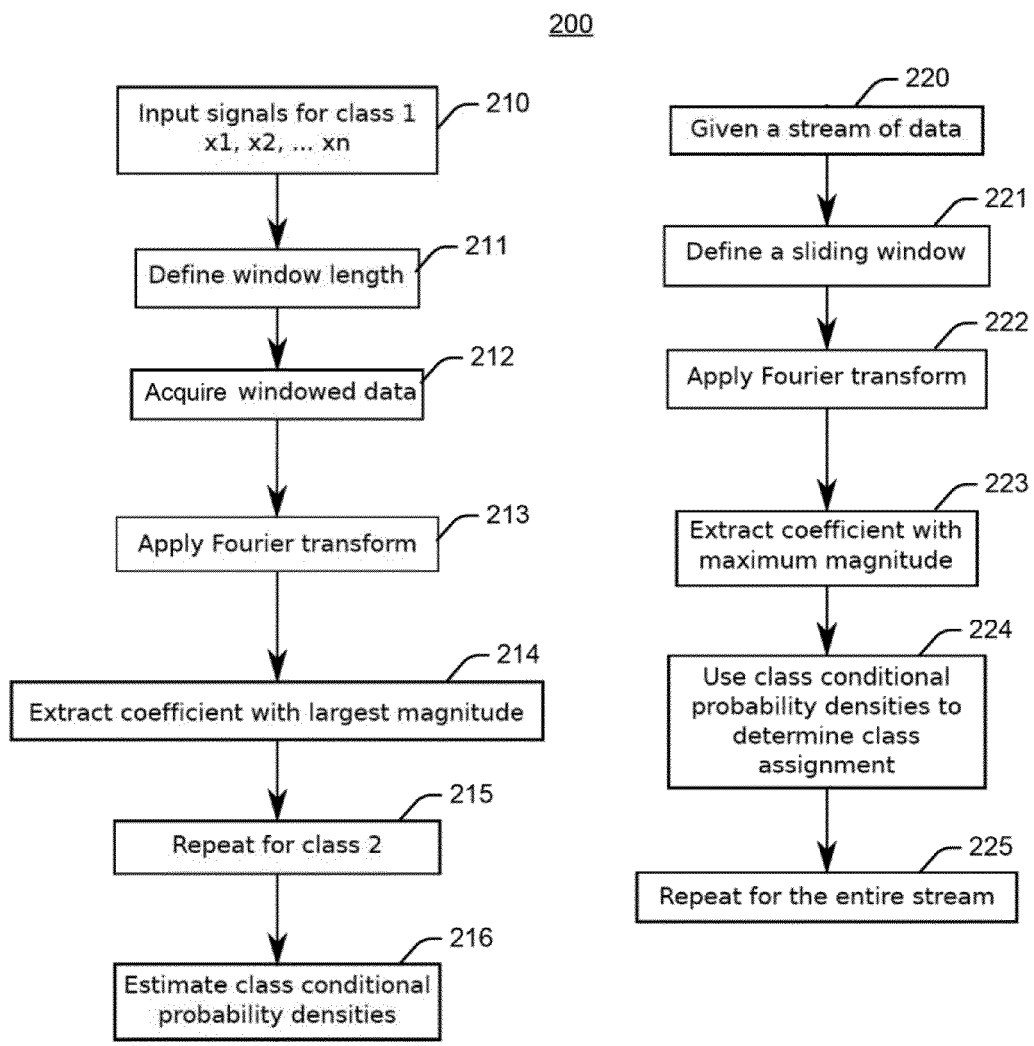
FIG. 2 is a processing diagram illustrating anomaly detection.

FIG. 2 is a processing diagram illustrating anomaly detection, e.g., as the process may be implemented to detect anomalies in flow regimes or other data streams. Although Fourier transform can be used in the frequency domain to analyze signals or streaming data, the transformed data loses the time information (providing only amplitude and frequency-based output). Briefly, the processes disclosed herein divide the data stream into time segments, or windows, then apply Fourier transform to analyze the spectrum by squaring the coefficients and ordering from largest to smallest. The window is moved (e.g., by one time unit) and then repeated, resulting in a set of coefficients over time. A training data set can be separated between high amplitude data and low amplitude data to develop a histogram having separate signal classes. A likelihood ratio can be computed to determine a probability that incoming signals fall into class 1 or class 2, e.g., for detecting different flow regimes or other anomalies in streaming data.

More specifically, at 210 input signals for a training data set may be received for a first class. A window length is defined at 211, and windowed data is acquired at 212. Fourier transform analysis is applied at 213 and the coefficient having the largest magnitude is extracted at 214. The process may be repeated 215 for a second signal class. At 216, class conditional probability densities are estimated.

Then, given a stream of actual data at 220, a sliding window is defined at 221. Fourier transform analysis is applied at 222 and the coefficient having the largest magnitude is extracted at 223. At 224, the class conditional probability densities determined at 216 are used to determine class assignment for the actual data received at 220. The process may be repeated 226 for the entire stream by moving the window (e.g., one time unit).

Figure 3:
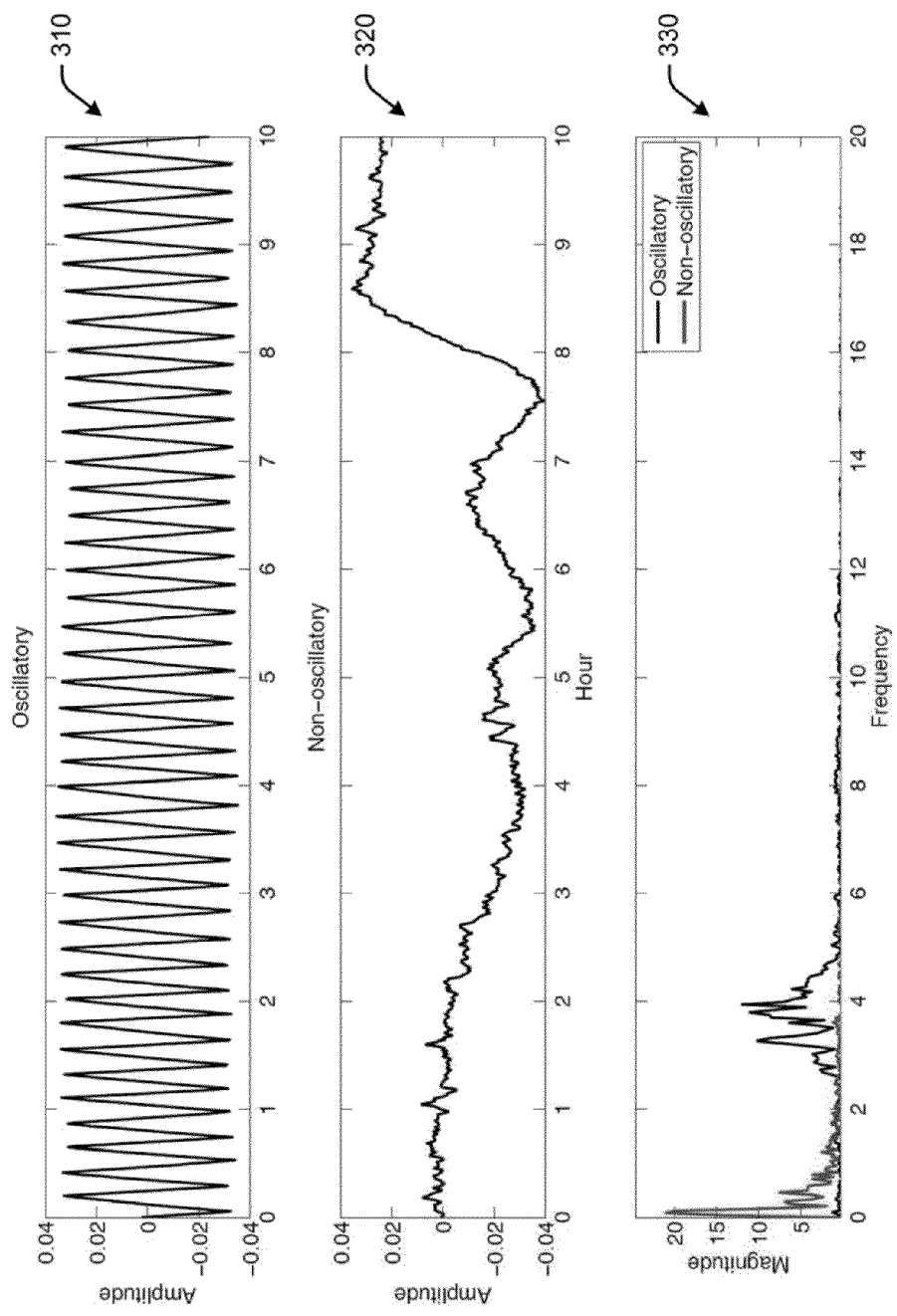
FIG. 3 shows plots of a) original data series in the oscillatory regime, b) original data series in the non-oscillatory regime, and c) frequency magnitude spectra of the data in a) and b).

FIG. 3 shows plots 300 of a) original data series in the oscillatory regime 310, b) original data series in the non-oscillatory regime 320, and c) frequency magnitude spectra of the data 330. The oscillations in the flow rates demonstrate behaviors that include 1) high oscillation—high amplitude, 2) high oscillation—low amplitude, 3) low oscillation, 4) linearity, and 5) discontinuities. When the high oscillation segment is examined carefully, the segment resembles a triangular oscillation. But there may be a hidden periodic structure of the time series that is varying over time. This quasi-periodic phenomenon can be extracted using frequency domain methods.

Although, flow rate time-series is quasi-periodic, the data represents a narrow band signal. In contrast, the non-oscillatory regions do not have any discernible structure. Furthermore, different artifacts appear in the data, such as missing values, sudden drops to zero value or "signal clipping" (e.g., due to sensor malfunction or the sensor being turned off).

In order to fully analyze the signal, the time series is deconstructed into oscillatory and non-oscillatory segments, as shown in plots 310 and 320, respectively. It can be seen in plot 310 that the flow rates are periodic in the oscillatory regions. Examining the time series carefully, there are different regions of varying frequencies. This periodic structure in the flow-rate signal makes a case for examining the time-series via frequency domain methods.

Fourier analysis may be used for frequency domain analysis. In classical Fourier analysis, bandwidth is defined in relation to the Fourier transform. Bandwidth is a measure of the range of frequencies (spectrum), and is usually measured in Hertz (Hz). The Fourier transform of a function f(t) provides a view of the signature of data known as the frequency spectrum, but masks the relationship between frequencies and time over which the data is analyzed. In other words bandwidth is a global characteristic of the function.

To overcome this deficiency, the systems and methods described herein disclose a moving window Fourier transform. The windowed Fourier transform can be used to determine local bandwidth by analyzing the data over windows, similar to the short time Fourier transform (STFT). The STFT involves computing Fourier coefficients over windows of the time series.

Figure 4:
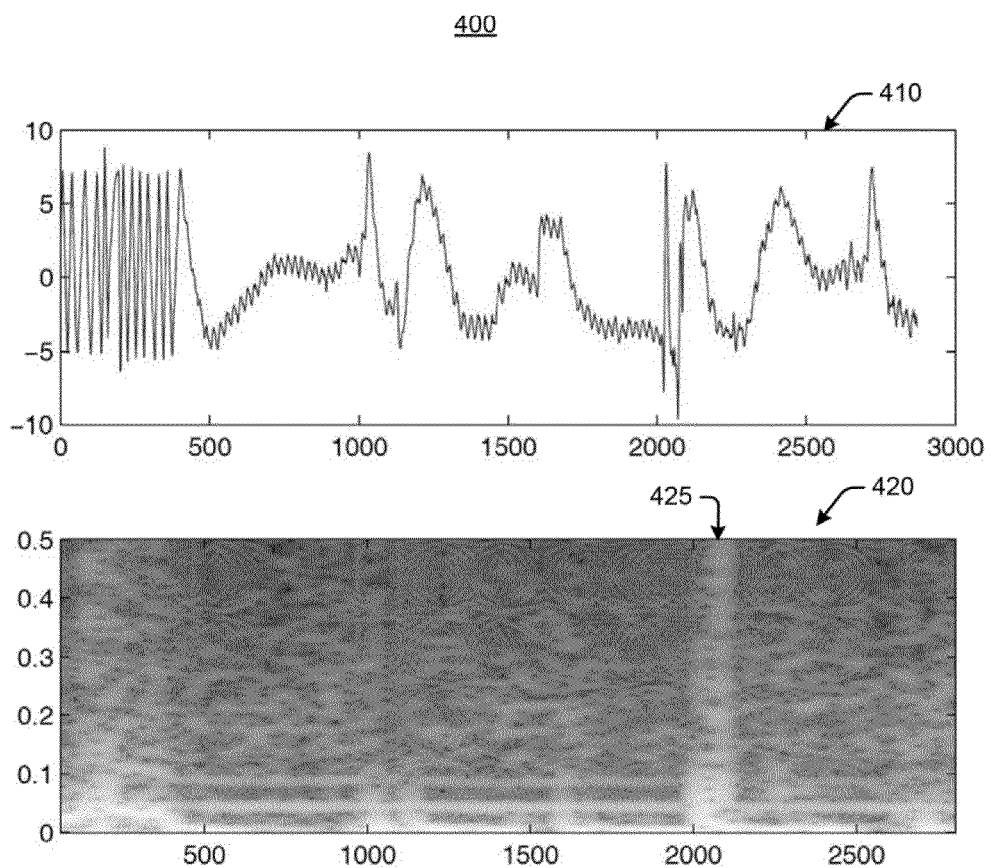
FIG. 4 shows plots of a) original flow rate time series, and b) spectrogram of the time series.

FIG. 4 shows plots 400 of a) original flow rate time series 410, and b) spectrogram 420 of the time series. The spectrogram 420 is a plot of time (along the y axis) versus frequencies (along the x axis), and includes a third dimension for the magnitude of the Fourier coefficients over the window W. This enables the frequency components to be understood within time windows. Major transitions in flow regimes are indicated in the spectrogram 420 by the white vertical plumes (e.g., at 425).

While the SIFT provides a mechanism to analyze frequencies over time, STFT is limited by conflict between time-frequency localization. The Heisenberg uncertainty principle states that time and frequency resolutions are inversely related, leading to the condition where analyzing a signal over longer windows compromises frequency resolution and vice-versa. Also in the STFT implementation, the window size is fixed which limits the frequency range.

As STFT cannot be used to find exact timing of regime shifts, an alternative approach based on dynamical systems is introduced herein to identify the time-varying periodic structures in the oscillatory segments of the data. In addition to the time-frequency spectrum shown in FIG. 4, the behavior of oscillations is examined by considering the underlying dynamical system which generated the time series.

The dynamical system is regulated by a set of parameters, and the evolution over time is known as the phase space of the process. The quasi-periodic regime is produced by a well-organized attractor. An "attractor" is defined herein in the context of dynamical systems, as a set towards which the process converges over time. An anomaly detector implementing this approach is able to identify the quasi-periodic region by an attractor. The properties of attractors in a reconstructed phase space can be understood using Takens time delay embedding theorem.

Takens theorem reconstructs the phase space with m-dimensional vectors with components sampled from the univariate time series having a time spacing of $\Delta T$. The parameters m and $\Delta T$ are known as the embedding dimension and time delay, respectively. Both of these parameters are estimated using segments of the data stream that is known to include oscillations.

The embedding dimension, m, is larger than the expected correlation dimension of the attractor, so that the time series is fully unfolded into phase space. The time delay, $\Delta T$, is chosen such that components of the time delay vector are minimally correlated. Mutual information between a time series, and a time series delayed by $\Delta T$, can be found as a function of $\Delta T$. The time delay that produces the first local minimum can be chosen in mutual information.

The correlation dimension is a measure of the dimensionality of the space occupied by a set of points. The correlation dimension can be estimated using the Grassberger-Procaccia algorithm. In this algorithm, the correlation sum, C(r), is calculated as a fraction of pairs of points that are within a distance r of each other. In D dimensional space, as r decreases, C(r) tapers off proportional to $r^D$, and therefore:

$$D = \lim_{r \to 0} \frac{\log r^D}{\log r}$$

Plotting log C(r) versus log r reveals a linear relationship with a slope equal to D for small r. With finite data, the curve levels off for small r, because each point is the only point in a neighborhood of radius r. These quantities can be used in generating the recurrence plot, as a matrix of all the pairwise distances between the different vectors generated considering the lag and embedding dimension.

This approach enables the time series to be characterized in terms of the reconstructed phase space, which provides an estimate of the embedding dimension. The estimate of the embedding dimension enables the order (number of lags) of the linear model to be selected to approximate the flow rate time-series.

As previously discussed, STFT can be applied to achieve time-frequency localization to separate the flow-rate regimes. This is achieved by breaking the time-series into contiguous windows. The Fourier coefficients are computed in each window, and the Fourier coefficient with largest magnitude over each window is selected as a classification feature. This approach works well because the larger Fourier coefficients are highly correlated to the signal. The window slides through the time series, each shifted by one time unit-producing one feature value over every window.

But using STFT coefficients may have some drawbacks, including time-frequency resolution. To improve, local methods may be used. These approaches can be sensitive to the length of the window. For example, a small window size provides frequency features that describe the rising and falling edge of the quasi triangular wave in the oscillations. But a small window size may produce false alarms because it is only sensitive to linear behavior. A larger window near the period of the triangular wave can be used to reduce the number of false alarms because it is covering a range of frequencies over the period of the signal.

In another example, the time-frequency uncertainty can be managed by quantifying the structure of the time series.

Quantifications are based on locally determined time features particular to the structure of the oscillatory signal. In the time domain, frequency can be defined as the time between consecutive peaks (or troughs), or the time between pairs of zero crossings. Zero crossings are time instances when the time series crosses zero, and this technique is capable of recognizing a single cycle of a periodic signal. This approach can be strengthened by considering amplitude-based features, in addition to the local period estimates.

In the oscillatory region, the time between local extrema is the half-period of a single oscillation, and hence can be considered an estimate of local frequency. As used herein, the term "peak" is used to refer to both local maxima and minima. The ith peak is denoted $P_i$, and the time of this peak as $t(P_i)$. The feature time between peaks is therefore $\Delta t(P_i) = t(P_i) - t(P_{i-1})$.

Figure 6A:
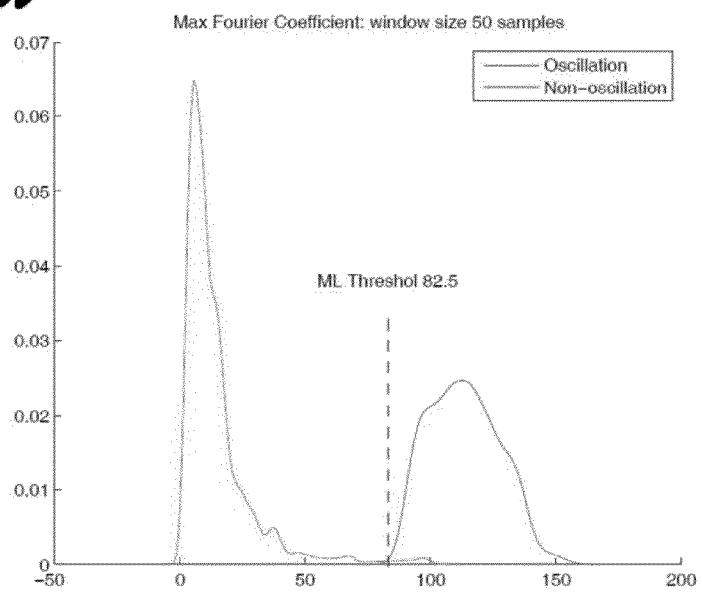
FIG. 6 are plots showing empirical probability density functions estimated by kernel smoothing, wherein a) uses the Max Fourier coefficient, b) uses the time between peaks, c) uses height between peaks, and d) uses sample differences.
Figure 6B:
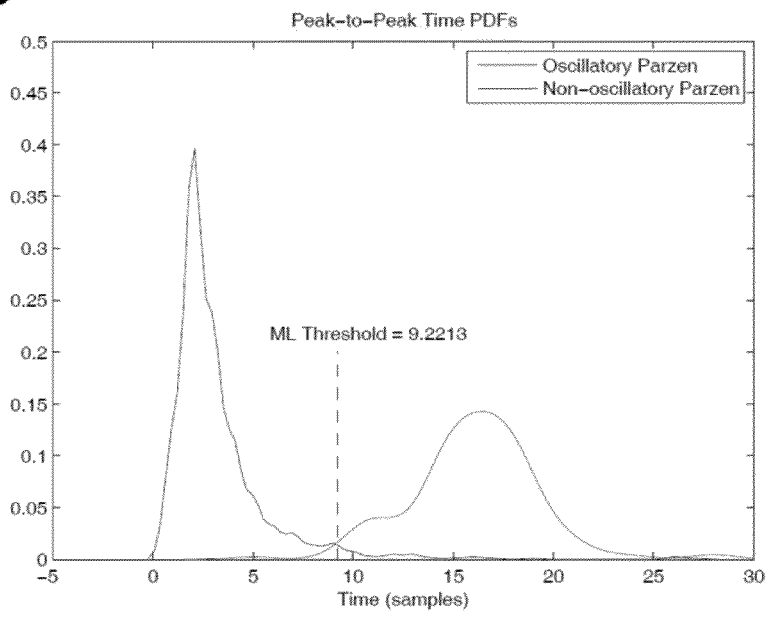

Empirical distributions for $t(P_i)$ can be seen in FIG. 6a based on training data of known classes (oscillatory and non-oscillatory regimes). A threshold, based on likelihood ratio of empirical densities, can be determined using the training data. The samples between peaks can then be classified based on time differences relative to the threshold.

Figure 5:
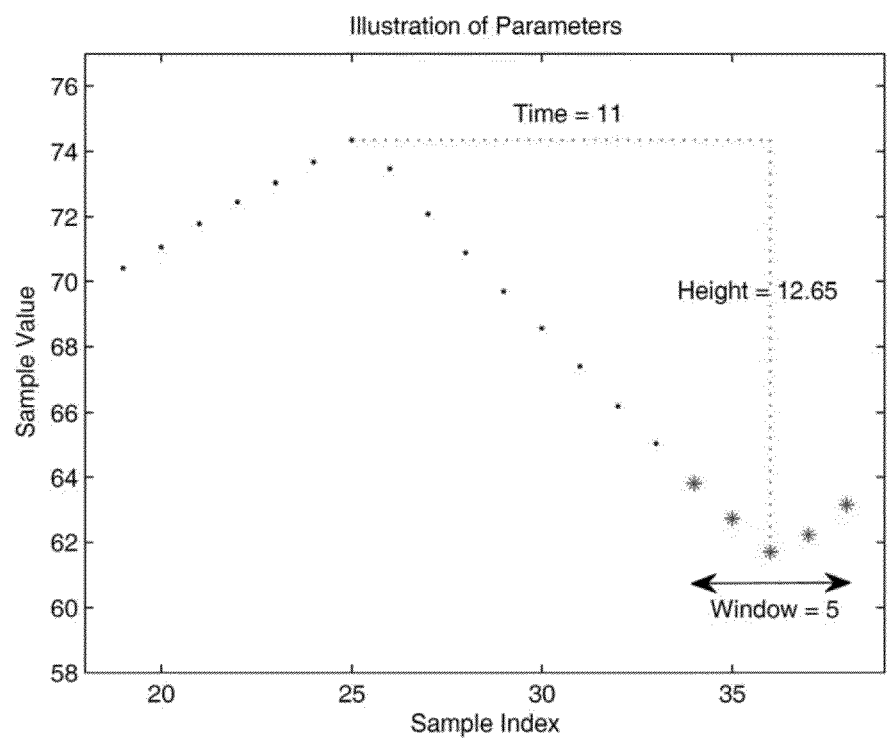
FIG. 5 is a plot illustrating parameters for the peak-to-peak method.

Peak-to-peak heights can be used as another discriminatory feature variable. The height of the ith peak is denoted $h(P_i)$, and the height between peaks is $\Delta h(P_i) = h(P_i) - h(P_{i-1})$. The classes have greater separation in this feature variable, thereby lowering the chances of misclassification. When a peak-to-peak feature is classified, all of the samples between peaks are classified to the same class. This grouping of sample classifications is more robust than the sample-by-sample approach, because oscillatory behavior is persistent over time. But this technique is also based on a constant amplitude. Therefore, both techniques may be combined to create a two-dimensional discriminant feature vector. An example algorithm to detect local extrema and classify the data based on their features is shown below as Algorithm 1:

---
Algorithm 1 On-line classification based on peak features
---
Given time series s, with N samples
L = window length for peak detection
Require: L odd
$a = \frac{L-1}{2}$
Y = {$y_j = (\Delta t(P_j), \Delta h(P_j))$|j is the index of feature pairs in the training set}
Set θ = threshold on |Δh(P)|
i = 0
for n = a + 1 to N − a do
  $W_P = s_{n-a}$ to $s_{n+a}$
  if $s_n == \max(W_P)$ or $s_n == \min(W_P)$ then
    i = i + 1
    $t(P_i) = n$
    $h(P_i) = s_n$
    if i > 1 then
      $\Delta t(P_i) = t(P_i) - t(P_{i-1})$
      $\Delta h(P_i) = h(P_i) - h(P_{i-1})$
      $x_i = (\Delta t(P_i), \Delta h(P_i))$
      if 1-dimensional feature space then
        if $\Delta h(P_i) > \theta$ or $\Delta h(P_i) > -\theta$ then
          Assign samples from $P_{i-1}$ to $P_i$ to the oscillatory class
        else
          Assign samples from $P_{i-1}$ to $P_i$ to the non-oscillatory class
        end if
      else if 2-dimensional feature space then
        Find $\mathrm{argmin}_j\, d_{Euc}(y_j, x_i)$
        Assign samples from $P_{i-1}$ to $P_i$ to the class of $y_j$ ---
Algorithm 1 On-line classification based on peak features
---
      end if
    end if
  end if
end for FIG. 5 is a plot 500 illustrating parameters for the peak-to-peak method. The peak-to-peak method is based on time between peaks. Therefore, analysis has to wait for the next peak before classifying any samples. This induces latency in detection. The term "latency" is used herein to refer to the number of samples that elapse from the current sample before a decision is made on an event. For the peak-to-peak features, the latency is the number of samples between peaks plus any additional samples. This represents half the window size needed to detect the most recent peak. In an example, the average peak-to-peak time is 16 samples, and if L=5, the average latency is 18.

Although the peak-to-peak height feature provides separation between classes, the latency can be reduced by considering differences between adjacent samples, referred to herein as sample differencing. A threshold may be selected based on the likelihood ratio of the empirical probability density functions (EPDF) of the differences $\Delta s_n = s_n - s_{n-1}$, given a discrete time series s at time n. An example algorithm for implementing online sample differencing is shown below as Algorithm 2:

---
Algorithm 2 On-line classification based on sample differences
---
Given time series s, with N samples
W = window size for grouping
M = number of samples in group that must be labeled oscillatory
Y = {$y_j = (\Delta s_j, \Delta s_{j-1})$|j is the index of feature pairs in the training set}
Feature pairs are labeled with 1 if oscillatory and with 0 if non-oscillatory
Set θ = threshold on |Δs|
for n = 3 to N do
  $\Delta s_n = s_n - s_{n-1}$
  $\Delta s_{n-1} = s_{n-1} - s_{n-2}$
  $x_n = (\Delta s_n, \Delta s_{n-1})$
  if 1-dimensional feature space then
    if $\Delta s_n > \theta$ or $\Delta s_n < -\theta$ then
      Set $C_n = 1$
    else
      Set $C_n = 0$
    end if
  else if 2-dimensional feature space then
    Find $\mathrm{argmin}_j\, d_{Euc}(y_j, x_n)$
    Set $C_n$ = binary label of training feature vector $y_j$
  end if
  if n > 2W then
    if $\sum_{i=n-2W+2}^{n-W+1} C_i \geq M$ or $\sum_{i=n-W+1}^{n} C_i \geq M$ then
      Classify $s_{n-W+1}$ as oscillatory
    else
      Classify $s_{n-W+1}$ as non-oscillatory
    end if
  end if
end for It is noted that sample differencing may be sensitive to noise in the data stream. If high oscillations persist over a long period, the approach can be strengthened by waiting for a set of differences around a point in question to satisfy the threshold. Although waiting may introduce latency (in order to observe future samples before making a decision), the number of points observed are also fewer compared to the peak-to-peak method.

At the peaks of the oscillatory region, the consecutive differences of the signal decrease in magnitude. Therefore, these areas are prone to missed detections. To reduce missed detections, a small number of samples M may be selected for a window of W samples such that M<W satisfies the threshold. At the onset of oscillation, only future samples satisfy the threshold, while at the end of oscillation only past samples satisfy the threshold.

In an example, two windows may be used to reduce or altogether prevent failed detection at the edges. One window includes the sample in question and the next W−1 samples, while the other window includes the sample in question and the previous W−1 samples. A warning is issued if either window contains M or more points above the threshold, with a latency of W−1 samples.

The selection of M is a tradeoff between missed detections and false alarms. If M is low, warnings can be triggered by only a few points, therefore M can be selected to include a majority of points in the window. For example, a two-thirds majority may be used. The sample differences procedure is controlled by two parameters: window size (W), and the adjacent differences parameter (M).

The discussion heretofore, focused on the characterization of the high oscillation region of the signal via a single and bivariate features extracted from the data. These features include the amplitude of the Fourier coefficients in a local neighborhood, the peak-to-peak time $\Delta t(P)$ and height $\Delta h(P)$, and the sample differences $\Delta s_n$. The Fourier coefficients and sample differences are determined from current and previous data, and therefore can be used to classify on a sample-by-sample basis in real time.

Training sets of known classes were used to generate a distribution of the desired feature for each class. FIGS. 6a-d show the distributions for each of the features. The distributions are used to establish a threshold, $\theta$ on the feature. It can be seen that the distribution of peak-to-peak height has the best separation between classes for this data set. Therefore, this feature may be used in the single-feature case, rather than time between peaks which has overlapping oscillatory and non-oscillatory distributions. But time between peaks may be used for other data sets. The performance of the Algorithms 1 and 2 can be compared using the receiver operating characteristic (ROC) curves in FIG. 7.

FIG. 7 is a plot showing receiver operating characteristic curves using different thresholds. These curves were obtained using labeled data over a week of flow-rate measurements, distinct from the training data. The ML point represents the empirical distribution maximum-likelihood threshold. The ROC plots the true positive rate (TPR) against the false positive rate (FPR). TPR is the ratio of true positives to actual positives (true positives and false negatives) FPR is the ratio of false positives to actual negatives (false positives and true negatives). Points closest to the top left of the plot shown in FIG. 7 represent the best performance, with a high TPR and low FPR.

The ROC curves were generated by testing a range of thresholds, including the Maximum Likelihood (ML) threshold obtained from EPDF estimates. It is noted that although the ML threshold does not offer the best performance, the ML threshold does provide a reasonably good estimate. From the ROC, in the optimal case, peak-to-peak height outperforms both sample differences and the maximum Fourier coefficient.

The result clearly follows from the large separation between the distributions of peak-to-peak heights. The tradeoff is latency in determining peak-to-peak features. The TPR, FPR, and total error rate can be seen in Table 1.

TABLE 1

| Features | Class. Method | Parameters | Error Rate | TPR | FPR |
|---|---|---|---|---|---|
| Peak-to-Peak Features | | | | | |
| $\Delta h(P)$ | Threshold | $\theta = 11$ | 1.9% | 97.2% | 1.7% |
| Sample Differences | | | | | |
| $\Delta s_n$ | Threshold | $\theta = 0.44$ W = 1 M = 1 | 5.2% | 88.9% | 3.1% |

Figure 6C:
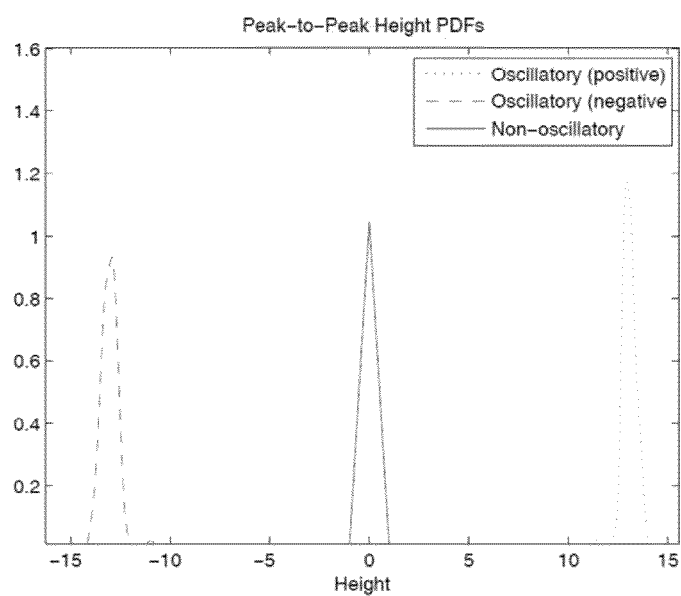
Figure 6D:
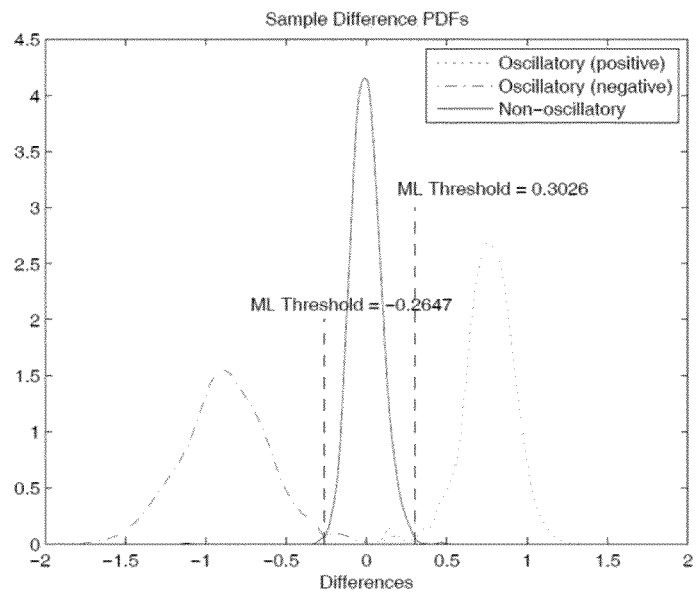

The values in Table 1 were calculated using testing data of approximately 62,000 samples. Table 1 compares the performance of single, and multi-feature classifiers. Column 1 is the feature(s) used: column 2 is the classification method, column 3 is the tuning parameter(s) of the classifier scheme, and column 4 is the error rate which is equal to the ratio of misclassifications of both types to total number of samples. The threshold was set at 11, very close to the oscillatory heights as can be seen in FIG. 6c. In doing so, the oscillatory training data represents the testing values well. By setting a tight threshold, false positives can be avoided.

Before continuing, it should be noted that the examples described above are provided for purposes of illustration, and are not intended to be limiting. Other devices and/or device configurations may be utilized to carry out the operations described herein.

FIG. 8 is a flowchart illustrating example operations which may be implemented for anomaly detection in streaming data. Operations 800 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Operation 810 includes applying statistical analysis to streaming data in a sliding window. Operation 820 includes extracting a feature. For example, when STFT is implemented, the feature may be the coefficient with maximum magnitude. For example, the statistical analysis may include applying Fourier transform to the streaming data to determine the coefficient, squaring the coefficient and ordering coefficients from largest to smallest, and then moving the sliding window (e.g., by one unit) and repeating. But statistical analysis is not limited to STFT, and may also include determining features using peak-to-peak and/or sample differences techniques, as discussed in more detail above.

Operation 830 includes determining class assignment for the feature using class conditional probability densities. In an application example, the class assignment indicates a flow regime, and may be used to identify an anomaly in a flow regime (e.g., in an oil or gas production environment).

The operations shown and described herein are provided to illustrate example implementations. It is noted that the operations are not limited to the ordering shown. Still other operations may also be implemented.

Further operations may include defining a size of the sliding window. Operations may also include estimating the class conditional probability densities for two classes. Operations may also include classifying the streaming data based on peak features and/or classifying the streaming data based on sample differences.

The operations may be implemented at least in part using an end-user interface (e.g., web-based interface). In an example, the end-user is able to make predetermined selections, and the operations described above are implemented on a back-end device to present results to a user. The user can then make further selections. It is also noted that several of the operations described herein may be automated or partially automated.

It is noted that the examples shown and described are provided for purposes of illustration and are not intended to be limiting. Still other examples are also contemplated.

The invention claimed is:

1. A method for anomaly detection in streaming data, the method implemented by a processor executing program code stored on non-transient computer-readable media, the method which when executed by the processor comprising:
applying statistical analysis to streaming data in a sliding window, wherein the streaming data is received from at least one data source;
extracting a feature from the streaming data, the feature identified based on a coefficient having a maximum magnitude in the sliding window;
determining class assignment for the feature using class conditional probability densities and a threshold; and,
identifying an event based at least in part upon the class assignment for the feature and responding to the event.

2. The method of claim 1, further comprising defining a size of the sliding window.

3. The method of claim 1, further comprising estimating the class conditional probability densities for two classes.

4. The method of claim 1, wherein statistical analysis further comprises applying Fourier transform to the streaming data to determine a coefficient with maximum magnitude.

5. The method of claim 4, further comprising squaring the coefficient and ordering coefficients from largest to smallest.

6. The method of claim 5, further comprising moving the sliding window by one unit and repeating.

7. The method of claim 1, wherein statistical analysis further comprises classifying the streaming data based on peak-to-peak features.

8. The method of claim 1, wherein statistical analysis further comprises classifying the streaming data based on sample differences, wherein the sample differences are defined by window size and adjacent differences parameter.

9. The method of claim 1, wherein the class assignment indicates an oscillatory flow regime.

10. The method of claim 1, wherein the class assignment indicates a separate oscillatory flow regime and a non-oscillatory flow regime.

11. A system for anomaly detection in streaming data, the system including program code stored on non-transient computer-readable media and executable by a processor to:
apply statistical analysis to streaming data in a sliding window;
extract a feature; and
determine class assignment for the coefficient using class conditional probability densities and a threshold; and
identify an event based at least in part upon the class assignment for the feature to facilitate a response to the event.

12. The system of claim 11, wherein the program is further executable to define a size of the sliding window.

13. The system of claim 11, wherein the program is further executable to estimate the class conditional probability densities for two classes.

14. The system of claim 11, wherein the program is further executable to apply Fourier transform to the streaming data to determine a coefficient with maximum magnitude.

15. The system of claim 11, wherein the program is further executable to square the coefficient and order coefficients from largest to smallest.

16. The system of claim 11, wherein the program is further executable to move the sliding window and repeat.

17. The system of claim 11, wherein the class assignment is based on a peak-to-peak determination.

18. The system of claim 11, wherein the class assignment is based on determining sample differences, wherein the sample differences are defined by window size and adjacent differences parameter.

19. The system of claim 11, wherein the program is further executable to classify the streaming data as oscillatory and non-oscillatory.

20. The system of claim 11, wherein the program code is further executable to determine a number of samples (M) in a window (W) of samples, is M<W to satisfy the threshold, and the number of samples (M) is a majority of points in the window (W) of samples.

* * * * *

UNITED STATES PATENT AND TRADEMARK OFFICE
CERTIFICATE OF CORRECTION

PATENT NO. : 9,218,527 B2
APPLICATION NO. : 13/248887
DATED : December 22, 2015
INVENTOR(S) : Choudur Lakshminarayan et al.

It is certified that error appears in the above-identified patent and that said Letters Patent is hereby corrected as shown below:

IN THE CLAIMS

In column 12, line 12, in Claim 11, delete "window;" and insert -- window, wherein the streaming data is received from at least one data source; --, therefor.

Signed and Sealed this
Twenty-sixth Day of April, 2016

Michelle K. Lee
*Director of the United States Patent and Trademark Office*